United States Patent [19]

Potok

[11] Patent Number: 5,488,722
[45] Date of Patent: Jan. 30, 1996

US005488722A

[54] SYSTEM AND METHOD FOR AUTOMATING IMPLEMENTATION AND EXECUTION OF CONSTRAINT MOST LIKELY TO BE VIOLATED IN A DATABASE

[75] Inventor: Thomas E. Potok, Apex, N.C.

[73] Assignee: International Business Machines Corporation, Armonk, N.Y.

[21] Appl. No.: 68,820

[22] Filed: May 28, 1993

[51] Int. Cl.$^6$ .................................................. G06F 17/30
[52] U.S. Cl. .................................. 395/600; 364/DIG. 1; 364/282.1
[58] Field of Search .................................... 395/600, 700

[56] References Cited

U.S. PATENT DOCUMENTS

| 4,933,848 | 6/1990 | Haderle et al. | 395/600 |
| 4,947,320 | 8/1990 | Crus et al. | 395/600 |
| 5,133,068 | 7/1992 | Crus et al. | 395/600 |
| 5,179,698 | 1/1993 | Bachman et al. | 395/600 |
| 5,193,182 | 3/1993 | Bachman et al. | 395/600 |
| 5,249,300 | 9/1993 | Bachman et al. | 395/800 |
| 5,386,557 | 1/1995 | Boykin et al. | 395/600 |

OTHER PUBLICATIONS

Peter Pin–Shan Chen "The Entity–Relationship Model—Toward A Unified View Of Data", ACM Transactions On Database Systems, vol. 1, No. 1, Mar., 1976, pp. 9–36.

Primary Examiner—Paul V. Kulik
Attorney, Agent, or Firm—Gregory M. Doudnikoff

[57] ABSTRACT

Disclosed is a system and method of operating a computer to update a database. An entry made by a user for creating, deleting or modifying an entity type instance is checked to determine applicable constraints, which are then activated and placed in a pool. A firing order is then determined for the activated constraints. The first ranked constraint is then coded, using database calls if necessary to provide data for the logical statements, after which the coded constraint is fired. If the constraint was violated an error is signalled and processing is returned to the step of activating constraints for treatment of revised user data. Otherwise, it is determined if any constraints remain to be fired before returning to the step of activating or exiting.

12 Claims, 5 Drawing Sheets

SYSTEM AND METHOD FOR AUTOMATING IMPLEMENTATION AND EXECUTION OF CONSTRAINT MOST LIKELY TO BE VIOLATED IN A DATABASE

BACKGROUND OF THE INVENTION

1. Technical Field

The invention relates to implementation and execution of constraints in a database based on an entity-relationship data model used to represent business data. Still more particularly, the invention relates to determination of applicable constraints upon user request for the modification, creation, or destruction of entity instances and to the automatic generation and execution of code for the applicable constraints.

2. Description of the Related Art

Entity-relationship (ER) modelling is a diagrammatic technique used to structure information about situations, for example, social organizations or business enterprises. ER modeling provides a framework to express information as data and to place the data in data structures for use as a database. ER data models are specifically designed to support an intuitive representation of a world through graphic presentation of entity types and relationships between entities types. The entity-relationship data model was proposed by Peter Pin-Shan Chen in his article *The Entity-Relationship Model—Toward a Unified View of Data* which appeared in the ACM Transactions on Database Systems, Vol. 1, No. 1, pages 9–37 (1976).

The AD/Cycle Information Model, described in the reference manual *AD/Cycle Information Model: Reference Volume 1: Enterprise Submodel*, which is available from International Business Machines Corporation, provides one vehicle for ER modeling. In the model, entity types are described for a plurality of conceptual constructs. The entity type, ENT_ENTITY_TYPE, is used as a template to categorize a class of people, things, or concepts having characteristics of interest to an enterprise database administrator.

An entity within a class of people, a class of things, or within a class of concepts, becomes an entity instance by classification into a specified ENT_ENTITY_TYPE. Everything that is given a description, that is anything which is the subject of a fact comprehended by the system, is an entity instance. Each entity type is a set of entity instances that are described by the same kinds of facts. Facts about an entity translate into attribute types, relationship links, or compound facts about entity instances, which identify the entity instance.

Relationship links are the directional component in the definition of a relationship type between instances of one or more entity types. An instance of a relationship type represents a type of symmetric connection or association between two entity instances of given types. An example of a symmetric or reciprocal relationship between two entities is given by the statement "John and Sally are siblings". Relationship links are directional, and two entity instances may be linked by complementary relationship links. An example of complementary relationship links would be "John is a child of Sally" and "Sally is a parent of John". Either type of relationship, as entities, have attributes, which are characterized for specific relationship instances by assignment of values. Although relationship links and relationship types are a kind of entity type, they are not referred to as such in this paper unless otherwise stated.

Completeness of a model is not a goal. A data model for a business enterprise may include the entity type "employees" meaning people employed by the enterprise. It would rarely be of interest to further include an entity type "people" and relate instances of that group into the entity type "employees" through a relationship "person-employee", even though such a representation might be feasible. It is simply impossible to record every conceivable piece of information. Entity types and relationship types are the collections of particular entity instances or relationship instances of the particular types defined.

Attributes have values for given entity and relationship instances. For example, an employee has an employee number, a name, a start date, an age, et cetera. An attribute is a map between instances of an entity type and a value set. An entity instance may be identified by an attribute value where the attribute mapping from the entity instance set to the value set is one-to-one. These are entity keys. Where more than one attribute meets this criteria, one is selected as the primary key. Primary keys may also be defined for a relationship link. Since a relationship instance is identified by the involved entities, the primary key of the instance may be formed by the primary keys of the involved entity instances. Keys may be provided by an arbitrary or abstract value given an entity instance, such as an employee number for an employee of a business.

Information associated with entities is separated from information associated with relationships. There is of course no bright line separating that which is an entity from that which is a relationship. Categorization of an object in a particular application is a problem for the designer of a specific database.

An ER diagram is representable in a visual format, as a chart. This is an advantage in terms of understandability, but has a disadvantage in that some important, information cannot be graphically represented. This information is accounted for by providing constraints, or logical limitations, for the model. A constraint is used to disallow an otherwise valid update of a database. Constraints are very precise, pseudo-logic rules about how items in a data model may be used.

In the AD/Cycle Information Model, some constraints have been hard coded for entity types, relationship links and relationship types. These are stored in executable form and thereby prevent a database designer from violating a constraint. Many other constraints have not been automated and their implementation has required manual checking upon creation, deletion and modification of entity instances.

SUMMARY OF THE INVENTION

It is therefore one object of the invention to provide an improved system and method for managing updates of a database.

It is another object of the invention to provide for implementation and execution of constraints in a database using an entity-relationship model as the database scheme.

It is yet another object of the invention to provide a system and method for determination of applicable constraints upon user input of data and to the automatic generation and execution of code before addition of the data to the database.

The foregoing objects are achieved as is now described. The invention provides a system and method of operating a computer to update a database. An entry made by a user for creating, deleting or modifying an entity type instance is checked to determine applicable constraints, which are then activated and placed in a pool. A firing order is then determined for the activated constraints. The first ranked constraint is then coded, using database calls if necessary to provide data for the logical statements, after which the coded constraint is fired. If the constraint is violated an error is signalled and processing is returned to the step of activating constraints for treatment of revised user data. Otherwise, it is determined if any constraints remain to be fired before returning to the step of activating constraints or exiting.

BRIEF DESCRIPTION OF THE DRAWINGS

The novel features of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
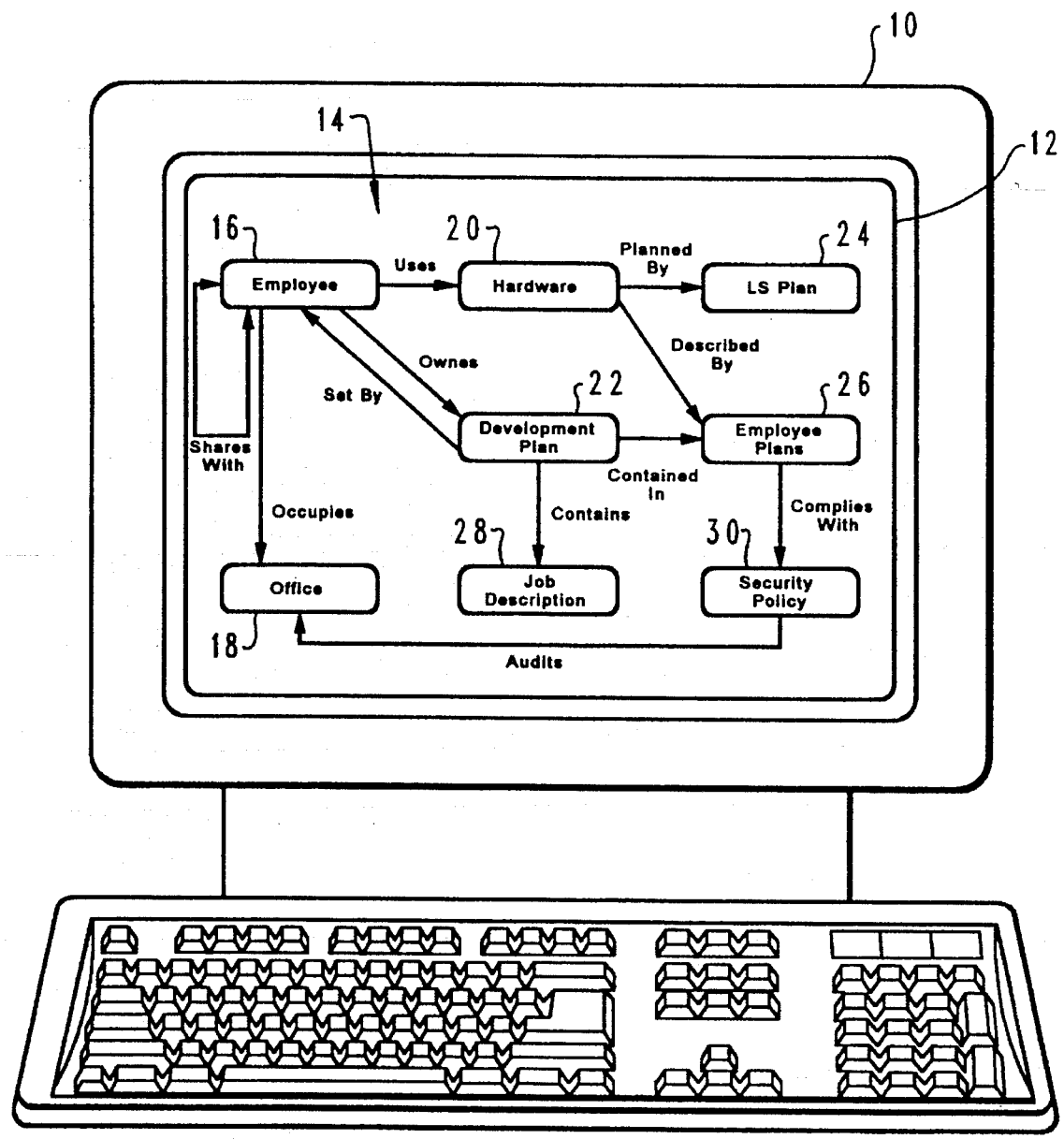
FIG. 1 is a pictorial representation of a computer terminal display of a user data model.

FIG. 1 illustrates a computer input/output terminal 10. Terminal 10 displays information on a screen 12 in the form of a data model graphic 14 which here represents a business enterprise. Several entity types are presented in graphic 14 including an employee entity 16 which is a class of people. Each employee is assigned to an office and accordingly employee entity type 16 is directionally linked to an office entity type 18 by the relationship "Occupies". An employee may share an office with another employee and so the relationship "shares with" forms a relationship from employee entity type 18 to itself.

Employees use selected equipment and thus employee entity type 16 has a relationship to a hardware entity type 20. Hardware instances are part of a plan 24 and related to a plan instance by the relationship "planned by". Employees may "own" an instance of a development plan 22, and the development plan instance may be "set by" a particular instance of an employee entity type 16. Both hardware entity type 20 and development plan 22 have relationship to an employee plan entity type 26, by the links "described by" and "contains", respectively. Development plan entity type 22 "contains" instances of job description entity type 28. Employee plan entity type 26 is directionally linked by the relationship "complies with" to security policy entity type 30. Security policy entity type 30 provides for "audits" of office instances in Office entity type 18.

Figure 2:
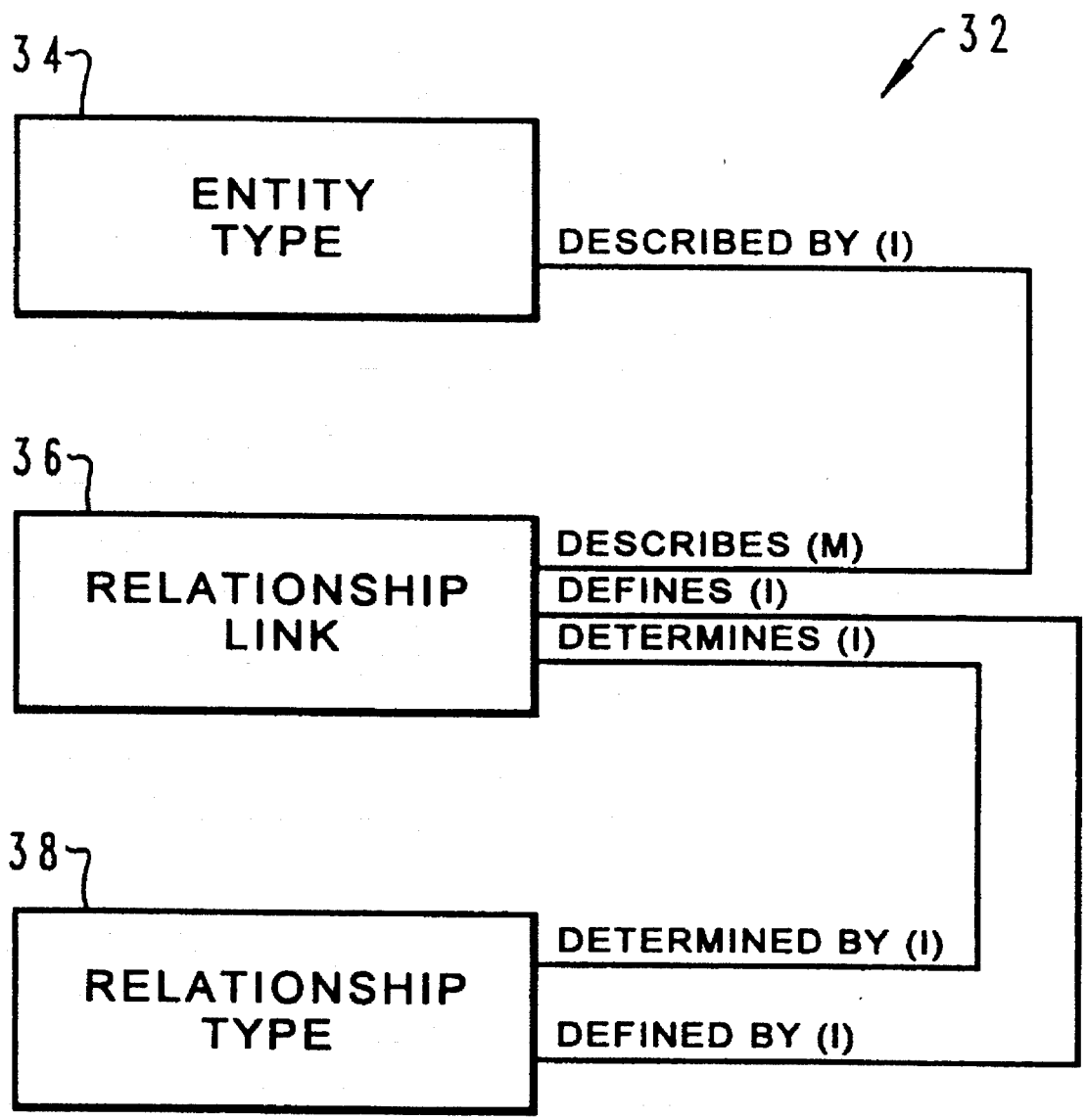
FIG. 2 is a graphic representation of an entity-relationship model supporting the user data model of FIG. 1.

FIG. 2 depicts an entity-relationship diagram 32 providing the constructs required to define the entity types within graphic 14. All specific entity types are based upon an entity type data structure 34, which is linked by a relationship "described by" to a relationship link entity type 36. The relationship is a one to many relationship meaning that a plurality of relationship link 34 instances may be related to one entity type 36 instance. The relationship from relationship link 36 back to entity type 34 is characterized as "describes".

A relationship link 36 instance represents the non-directional aspects of a relationship. Relationship type 38 and relationship link 36 are related by a "defines/defined by" relationship and a "determines/determined by" relationship. Both relationships are one to one, meaning one relationship link instance determines one relationship type instance.

Figure 3A:
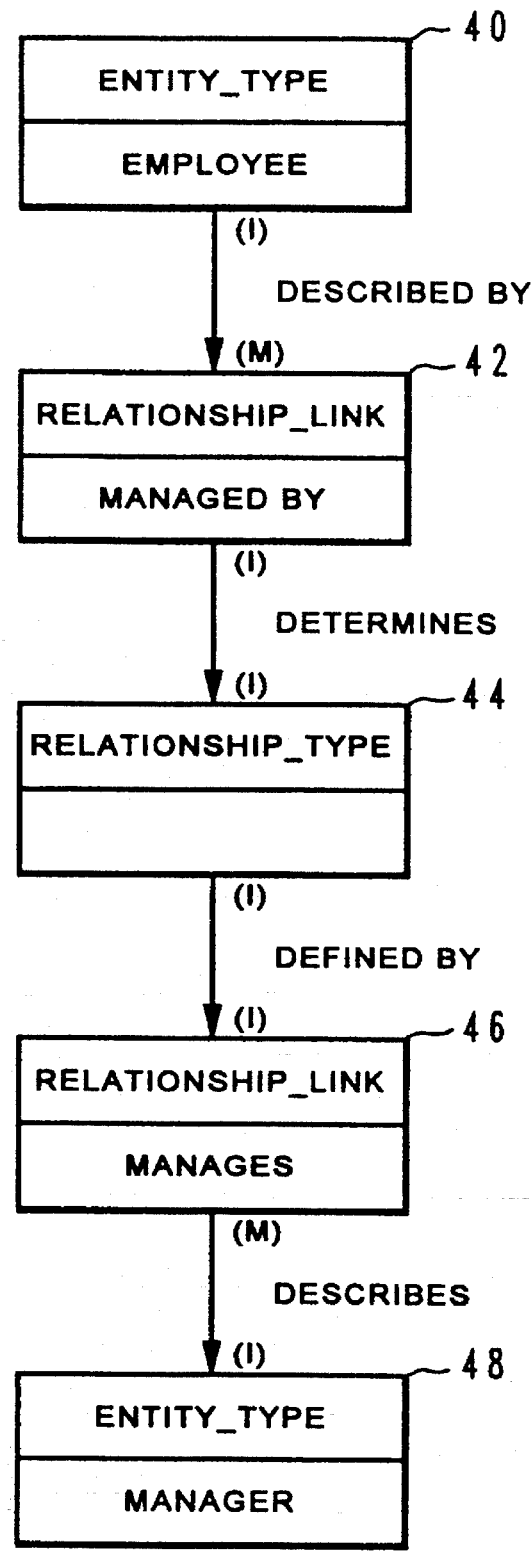
FIG. 3A is a graphic representation of a sequence of instances data the entity-relationship model.
Figure 3B:
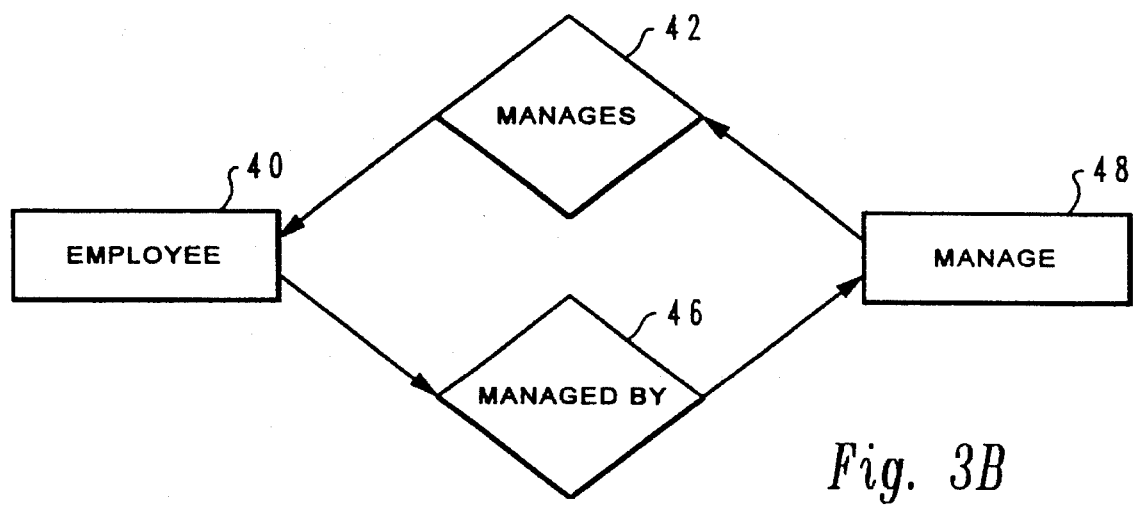
FIG. 3B is an information model representation of FIG. 3A.

FIG. 3A illustrates application of the diagram of FIG. 2. An employee entity type instance 40 is described by a relationship link instance 42 named "managed by". The managed by instance 42 determines a relationship type instance 44 which is in turn defined by a "manages" relationship link instance 46. Relationship link instance 46 then describes a manager entity type instance 48. FIG. 3B is a classical representation of the exemplary model of FIG. 3A, which is based upon the AD/Cycle Information Model.

Figure 4:
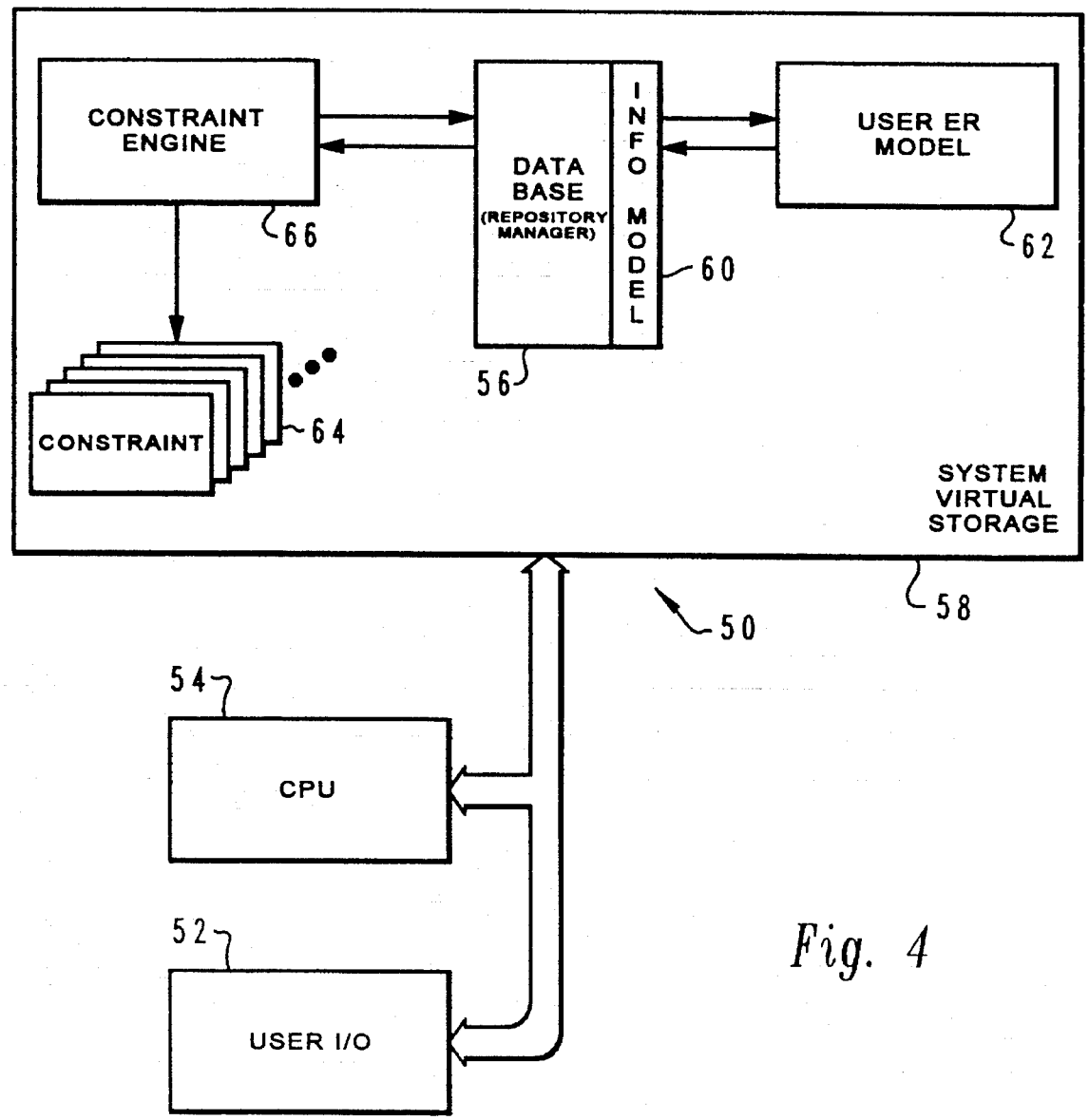
FIG. 4 is a high level functional block diagram of a data processing system on which a database with automated constraint enforcement in accord with the present invention is implemented.

FIG. 4 is a block diagram illustrating the interrelationship among the functional processes of a database implemented on a data processing system 50 providing automated constraint enforcement. Data processing system 50 comprises a user input/output interface 52 through which a user may make request for modification, creation, or deletion of an entity instance. A central processing unit 54 provides the usual sequencing and processing facilities for instruction execution, interruption action, timing functions, initial program loading, and other machine related functions. The physical implementation of central processing unit 54 may differ from data processing system to data processing system.

A entity-relationship model database 56 resides in system virtual storage 58 as a collection of functions including a repository manager and data structures which organize the information stored by the database. An information model 60 is part of database 56. Information model 60 supports the user entity-relationship data model 62 which in turn supports graphical presentation of the database structure to a user. System virtual storage 58 will be understood to include an address space wherein items are linked to virtual addresses but may be stored in either system memory or auxiliary storage.

Constraints 64, as previously described, are logical limitations on entity instances within database 56, which are not predictable from, nor conveniently represented in graphical representation of entity types and relationships and which therefore cannot be included in the data structures underlying an entity-relationship data model. Consider, for example, a business having an anti-nepotism rule which forbids an employee from being assigned a manager who is related by blood or marriage. For sake of simplicity, the rule may be (partially) implemented through forbidding assignment of a manager to an employee where they share last names. Logically, the constraint may be expressed as:

(1) If Employee Entity_Type, Name Attribute .AND. Manager Entity_Type, Name Attribute are the SAME then ERROR.

An error is a constraint violation and an attempted creation, modification, or deletion of an entity instance from database 56 which violates one of constraints 64 is not permitted. Constraint engine 66 is a process for enforcing constraints 64 on database 56.

Figure 5:
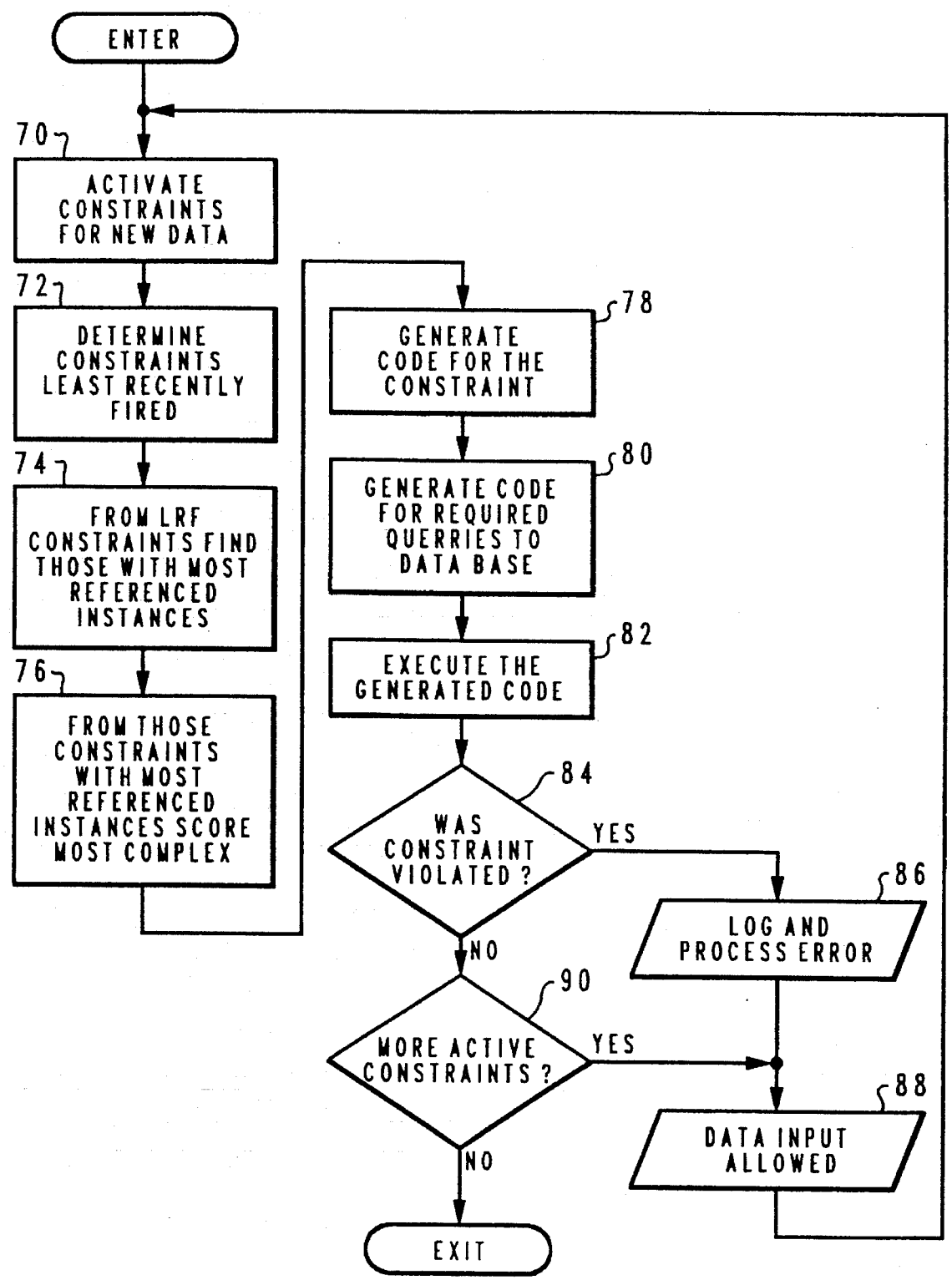
FIG. 5 is a high level logical flow chart of a process for implementing the constraint engine of FIG. 4.

FIG. 5 is a logical flow chart for the process of constraint engine 66. The process is called from the repository manager upon user request to modify, create, or delete an entity instance in database 56. The constraint engine is entered at step 70 where constraints are activated for the new data represented by the user request. Such data will already comply with the syntax of the information model. Lists of constraints linked to the particular kind of entity type for which change is requested and provided in system virtual storage 58. The activated constraints are placed in a pool or linked list for use. The steps provided for ordering and firing the constraints in sequence of the ordering are now entered.

Step 72 is executed to begin ordering the activated constraints for execution or firing. In step 72 the constraints are examined to determine which is (are) the least recently fired. If the pool consists exclusively of just activated constraints, none will have been fired and accordingly all are treated as being least recently fired. Step 72 is provided to prevent starvation occurring for any constraint during occasions of repeated loops through the steps provided for ordering and firing constraints.

Next, step 74 is executed to determine, from among the constraints determined to be least recently fired, the constraint(s) which reference(s) the most entity instances. Such constraints are preferred for early firing over constraints having fewer references to entity type instances on the basis that those constraints having more references are more likely to be violated. It is preferable to locate such violations as quickly as possible to save user and processor time.

Next, step 76 is executed. If a plurality of constraints have the most referenced instances, the constraints passed by step 74 are scored to find a most complex constraint. Scoring is based on the number of logical operations in the constraints. Again, the objective is to find the constraint most likely to be violated. If some other vehicle for predicting constraints most likely to be violated is available it may be substituted for steps 74 and 76.

Next, step 78 is executed to generate the appropriate code for the logical relationship of the next constraint in the firing order. Because constraint language of a system such as the AD/Cycle Information Model is very precise it can be directly translated into executable code. The translation process includes insertion at the appropriate points of the new data. Where data is not provided by the user, queries to database 56 may be generated and inserted into a firing program ahead of the constraint code (step 80). In the AD/Cycle Information Model these take the form of repository manager interface calls. The constraint engine retrieves and stores data using the repository manager Common Programming Interface. In step 82 the code for the queries and the constraint is executed and a result returned. Steps 78–82 operate in a manner similar to rule based inferencing in expert systems.

The result of step 82 can be an error (i.e. a constraint violation) or no error (i.e. no violation). The result is detected at step 84. If a constraint violation has occurred, the YES branch is taken from step 84 to step 86 where the error is logged and processed to bring it to the attention of a user. Next, step 88 is executed to accept additional data input from a user and to return processing to step 70 to activate the appropriate constraints for the new data. Constraints unfired but carried over from the prior steps become least recently used. If the constraint was determined not violated at step 84, the NO branch is taken to step 90, where it is determined if there are more active constraints. If YES, step 88 may be processed to allow additional data inputs from one or more users before returning processing to step 70. However, if no constraints remained unfired at step 90, processing is exited.

Constraints are written in constraint language, which is not readily understandable to a lay user of a computer system. Automated enforcement of constraints eliminates the possibility of user misunderstanding of a constraint or failure to apply a constraint. Such error or omission can render a data model worthless. The present invention makes such user error or omission impossible.

While the invention has been particularly shown and described with reference to a preferred embodiment, it will be understood by those skilled in the art that various changes in form and detail may be made therein without departing from the spirit and scope of the invention.

What is claimed is:

1. A method for operating a computer to update an entity-relationship model database, the method comprising the steps performed by the computer of:

accepting data for a new or modified instance or to delete an instance of an entity;

activating constraints applicable to the accepted data;

determining a firing order including at least a first constraint for firing from among the activated constraints, the first constraint being determined based on criteria which attempts to identify a constraint most likely to be violated;

firing the first constraint;

determining if the first constraint was violated; and returning to the step of activating constraints if any constraints remain to be fired.

2. A method as set forth in claim 1, wherein the step of determining a firing order for the activated constraints includes:

finding a set of least recently fired constraints and if only one constraint is least recently fired making the constraint first in the firing order;

if a plurality of activated constraints are found for the set of least recently fired constraints, finding which constraints within the set of least recently fired constraints reference the greatest number of entity instances and if only one constraint references the greatest number of entity instances making the constraint first in the firing order; and if a plurality of activated constraints reference the greatest number of entity and relationship instances, scoring the activated constraints for complexity and make a highest scoring constraint first in the firing order.

3. A method as set forth in claim 1, wherein the step of firing a first constraint in the firing order includes:

generating code for the first constraint;

generating code for inquiries into the database to complete inputs to the first constraint; and executing the generated code.

4. A method as set forth in claim 2, wherein the step of firing a first constraint in the firing order includes:

generating code for the first constraint;

generating code for inquiries into the database to complete inputs to the first constraint; and executing the generated code.

5. A method as set forth in claim 1, and further comprising: logging violations of a constraint as error.

6. A method as set forth in claim 1, wherein the step of determining a firing order includes:

predicting a constraint from the activated constraint as most likely to be violated; and selecting the predicted constraint for the firing step.

7. A constraint enforcement apparatus for an entity-reference model database on a data processing system, comprising:

user input means for requesting modification, creation or deletion of entity type instances in the database;

a plurality of constraints resident in a system storage; means for activating constraints applicable to user input requests;

means for selecting a constraint for firing from among the activated constraints, said selecting means comprising means for predicting a constraint from the activated constraints as most likely to be violated and means for selecting the predicted constraint as first to be fired;

means for firing the constraint; and means for determining if the constraint was violated.

8. Apparatus as set forth in claim 7, wherein the means for selecting a constraint for firing includes:

means for finding a set of least recently fired constraints and, if only one constraint is least recently fired, for making the least recently fired constraint first in a firing order;

means responsive to location of a plurality of least recently fired constraints for finding constraints within the set of least recently fired constraints which reference a greatest number of entity instances;

means responsive to finding of one constraint with the greatest number of entity instances for making the one constraint first in the firing order; and means responsive to finding a plurality of activated constraints which reference the greatest number of entity instances for scoring each of the constraints referencing the greatest number of entity instances for complexity and for making a highest scoring constraint first in the firing order.

9. Apparatus as set forth in claim 7, wherein the means for firing the constraint include:

means for coding the constraint;

means for coding inquiries into the database to provide values for variables in the constraint; and means for executing the code.

10. Apparatus as set forth in claim 8, wherein the means for firing the constraint includes:

generating code for the highest scoring constraint;

generating code for inquiries into the database to provide values for variables in the highest scoring constraint; and executing the generated code.

11. Apparatus as set forth in claim 9, wherein the step of selecting a constraint for firing includes:

means for finding a set of least recently fired constraints and if only one constraint is least recently fired for making the least recently fired constraint first in a firing order;

means responsive to location of a plurality of least recently fired constraints for finding constraints within the set of least recently fired constraints which reference a greatest number of entity instances;

means responsive to finding of one constraint with the greatest number of entity instances for making the one constraint first in the firing order; and means responsive to finding a plurality of activated constraints which reference the greatest number of entity and relationship instances for scoring the activated constraints for complexity and for making a highest scoring constraint first in the firing order.

12. Apparatus as set forth in claim 7, and further comprising:

means for logging violations of a constraint as error.

* * * * *